(12) United States Patent
Nakano et al.

(10) Patent No.: US 7,775,104 B2
(45) Date of Patent: Aug. 17, 2010

(54) THERMAL FLOWMETER IN WHICH RELATIONSHIP AMONG LENGTH OF HEAT RESISTOR, HEATING TEMPERATURE FOR THE HEAT RESISTOR, AND POWER SUPPLIED TO THE HEAT RESISTOR IS PRESCRIBED

(75) Inventors: Hiroshi Nakano, Hitachi (JP); Masahiro Matsumoto, Hitachi (JP); Keiji Hanzawa, Mito (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/020,025

(22) Filed: Jan. 25, 2008

(65) Prior Publication Data
US 2008/0229818 A1 Sep. 25, 2008

(30) Foreign Application Priority Data
Mar. 23, 2007 (JP) ............................. 2007-076726

(51) Int. Cl.
*G01F 1/68* (2006.01)
(52) U.S. Cl. ................................................. 73/204.26
(58) Field of Classification Search ............... 73/204.26
See application file for complete search history.

(56) References Cited

U.S. PATENT DOCUMENTS

| | | | | |
|---|---|---|---|---|
| 6,301,960 B1 * | 10/2001 | Yamakawa et al. | ....... | 73/204.26 |
| 6,357,294 B1 * | 3/2002 | Nakada | ..................... | 73/204.26 |
| 6,536,274 B1 * | 3/2003 | Zushi et al. | ............... | 73/204.26 |
| 6,557,411 B1 * | 5/2003 | Yamada et al. | ........... | 73/204.26 |
| 6,684,693 B2 * | 2/2004 | Tanimoto et al. | ......... | 73/204.26 |
| 6,729,183 B2 * | 5/2004 | Tanimoto et al. | ......... | 73/204.26 |
| 6,752,014 B1 * | 6/2004 | Kanke et al. | ............. | 73/204.15 |
| 6,923,053 B2 * | 8/2005 | Yamada et al. | ........... | 73/204.26 |
| 7,228,614 B2 * | 6/2007 | Yamada et al. | ................ | 29/595 |
| 2002/0007673 A1 * | 1/2002 | Tanimoto et al. | ......... | 73/204.26 |
| 2002/0073774 A1 * | 6/2002 | Kohno | ..................... | 73/204.26 |
| 2003/0183000 A1 * | 10/2003 | Yamada et al. | ........... | 73/204.26 |
| 2004/0069061 A1 * | 4/2004 | Watanabe et al. | ........ | 73/204.26 |
| 2005/0229694 A1 | 10/2005 | Matsumoto et al. | | |
| 2006/0037390 A1 * | 2/2006 | Nakano et al. | ........... | 73/204.21 |
| 2006/0096305 A1 * | 5/2006 | Hanzawa et al. | .............. | 62/183 |
| 2006/0144138 A1 * | 7/2006 | Yamada et al. | ........... | 73/204.26 |

FOREIGN PATENT DOCUMENTS

| | | |
|---|---|---|
| JP | 2004-205498 | 7/2004 |
| JP | 2005-283381 | 10/2005 |

* cited by examiner

*Primary Examiner*—Harshad Patel
(74) *Attorney, Agent, or Firm*—Brundidge & Stanger, P.C.

(57) ABSTRACT

To reduce power consumption by a thermal flowmeter while good flow-rate detection sensitivity is maintained, it is only necessary to reduce power consumption by a heat resistor under predetermined conditions. Specifically, provided that a width Wh of the heat resistor is between 100 micrometers and 400 micrometers inclusive ($100 \leq Wh \leq 400$), it is only necessary that a relationship among the length Lh of the heat resistor, a temperature increase $\Delta Th$ for the heat resistor, and a maximum permissible power Phmax to be supplied to the heat resistor be set so as to satisfy a formula $1.4 \leq \Delta Th \cdot Lh/Ph max \leq 2.8$ in order to maintain good flow-rate detection sensitivity. Accordingly, the length of the heat resistor and the temperature increase in the heat resistor are set so that the maximum power consumption can be reduced within a range in which the formula is satisfied.

7 Claims, 7 Drawing Sheets

THERMAL FLOWMETER IN WHICH RELATIONSHIP AMONG LENGTH OF HEAT RESISTOR, HEATING TEMPERATURE FOR THE HEAT RESISTOR, AND POWER SUPPLIED TO THE HEAT RESISTOR IS PRESCRIBED

BACKGROUND OF THE INVENTION

1. Field of the Invention

The present invention relates to a thermal flowmeter for measuring a fluid flow rate, the thermal flowmeter including a heat resistor formed on a substrate.

2. Description of the Related Art

The mainstream of a flow rate sensor for detecting an intake air amount of an internal combustion engine of an automobile or the like is, for example, a thermal air mass flow sensor capable of directly measuring a mass flow rate.

Recently, a thermal flowmeter has been proposed which has a sensor element fabricated on a semiconductor substrate of silicon (Si) or the like by use of micromachining technology. In such a semiconductor-type thermal flowmeter, a heat resistor is formed on a thin film portion of several microns formed on the semiconductor substrate.

Since the heat resistor is formed on a thin film, the semiconductor-type thermal flowmeter has a small heat capacity, and hence is capable of rapid response and low-power drive. Moreover, microfabrication makes it easier to form a configuration capable of detecting a temperature variation between the upstream and downstream of the heat resistor, and of thereby judging whether the flow is a forward flow or a reverse flow.

Examples of the thermal flowmeter of the above type are disclosed in Japanese Patent Application Laid-open Publication Nos. 2004-205498 and 2005-283381.

Japanese Patent Application Laid-open Publication No. 2004-205498 discloses a technique which improves sensitivity while reducing power consumption by using boron-doped single crystal silicon to form upstream and downstream heaters, and also by setting the line widths of the heaters at 7 micrometers or greater.

Japanese Patent Application Laid-open Publication No. 2005-283381 discloses a technique for enabling a power supply from an ECU (engine control unit) as a power source for the thermal flowmeter, by reducing the amount of heat produced by a temperature sensing resistor in order that a sensor output error due to variations in the voltage outputted from the ECU can be reduced.

A pressure sensor and a temperature sensor used in an automobile are operable with power supply from an ECU. Thus, if the thermal flowmeter can receive power supply from an ECU rather than from a battery, the thermal flowmeter does not need circuitry for protection against electrical noise and overvoltage as well as a power supply line from a battery.

The techniques disclosed in Japanese Patent Application Laid-open Publication Nos. 2004-205498 and 2005-283381 enable reduction in power consumption by the thermal flowmeter and power supply from an ECU to a thermal flowmeter.

SUMMARY OF THE INVENTION

However, in the case of employing power supply from an ECU, voltage, current and electric power are significantly limited as compared to the case of using battery power. For example, a power supply voltage is limited to 5 V; the current, 10 mA to 20 mA supply; and the electric power, 50 mW to 100 mW. Hence, it is necessary to reduce power consumption by and an operating voltage for the heat resistor in order to drive a thermal flowmeter by using power supply from an ECU.

In many thermal flowmeters, a flow rate is measured on the basis of the amount of heat radiated from the heat resistor under the influence of airflow or a temperature distribution in the vicinity of the heat resistor, while a heating temperature for the heat resistor is kept constant. Thus, power consumption by a heat resistor formed on the sensor element is particularly high in a thermal flowmeter. Further, greater airflow leads to higher power consumption by a heat resistor. This is due to the facts that a flow velocity of an intake air taken in by the internal combustion engine of an automobile sometimes reaches 80 m/s at maximum, and that power needs to be continuously supplied to the heat resistor in order to keep the temperature of the heat resistor constant even against such a high flow velocity.

When the heating temperature for the heat resistor is simply lowered for the purpose of achieving low power consumption, problems arise that the sensitivity is decreased and that the resistance to contamination is deteriorated. Although the descriptions of the thermal flowmeters disclosed in Japanese Patent Application Laid-open Publication Nos. 2004-205498 and 2005-283381 include the reduction in power consumption, no proposal has been made for achieving lower power consumption without reducing the heating temperature for the heat resistor.

An object of the present invention is to provide a thermal flowmeter capable of receiving power supply from a control unit, and capable of achieving low power consumption without reducing the heating temperature for its heat resistor.

A thermal flowmeter of the present invention includes a heat resistor and a temperature sensor element. In the thermal flowmeter, the heat resistor is supplied with power so that the temperature of the heat resistor is higher than a fluid temperature by a temperature increase $\Delta Th$ (° C.), and a fluid flow rate is measured by using a value outputted from the temperature sensor element.

Moreover, in the thermal flowmeter of the present invention, when the length Wh of the heat resistor in a direction of flow of the fluid is between 100 micrometers and 400 micrometers inclusive, the relationship between a length Lh and the temperature increase $\Delta Th$ is set so as to satisfy a formula: $1.4 \leq \Delta Th \cdot Lh / Ph \leq 2.8$, where Ph denotes maximum permissible power (W) to be supplied to the heat resistor, and Lh denotes the length (m) of the heat resistor in a direction perpendicular to the direction of flow of the fluid.

The present invention can provide a thermal flowmeter capable of receiving power supply from a control unit without requiring an expensive protection circuit, and capable of achieving low power consumption without reducing the heating temperature for the heat resistor.

DETAILED DESCRIPTION OF THE PREFERRED EMBODIMENTS

Description will be given below of a first embodiment of the present invention with reference to the accompanying drawings.

Firstly, description will be given with regard to a basic configuration and the operation principle of a thermal flowmeter according to the first embodiment of the present invention. Incidentally, the first embodiment as will be described below is an example of the present invention as applied to an air mass flow sensor for measuring an intake air amount of an internal combustion engine.

Figure 1:
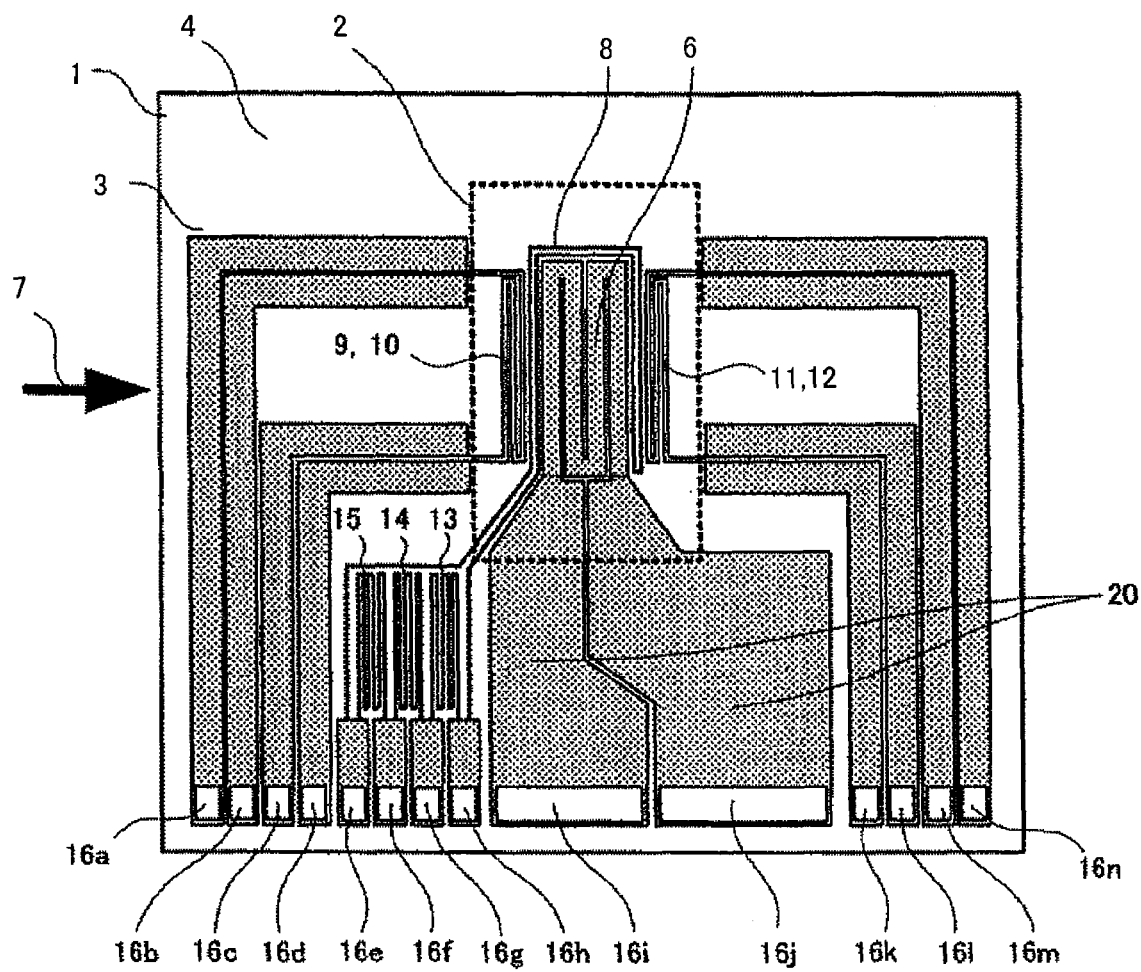
FIG. 1 is a plan view showing a sensor element according to a first embodiment of the present invention.
Figure 2:
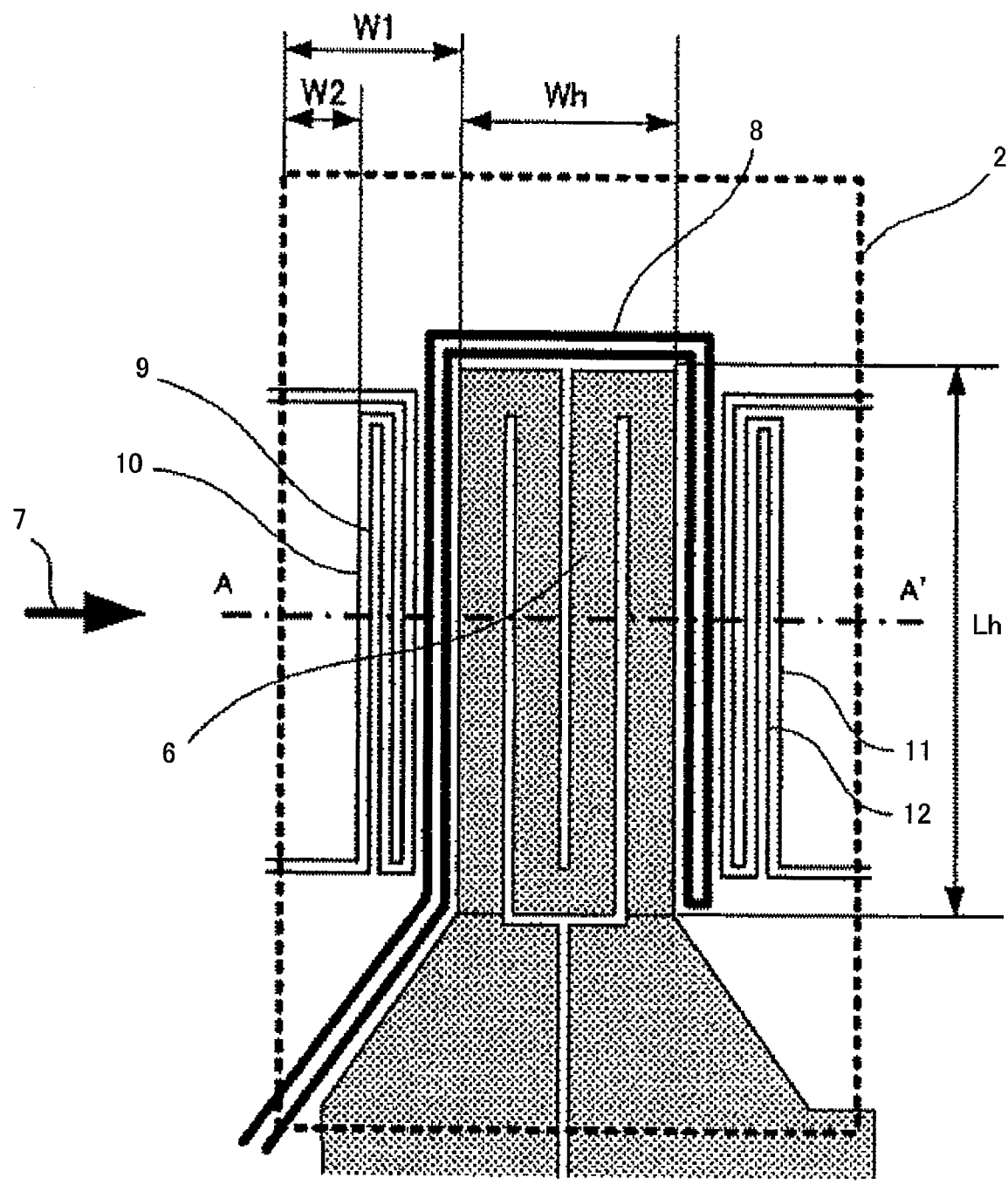
FIG. 2 is an enlarged plan view of a diaphragm unit in FIG. 1.

FIG. 1 is a plan view showing a sensor element 1 of the thermal flowmeter according to the first embodiment of the present invention. FIG. 2 is an enlarged view of a diaphragm unit (or thin film portion) 2 shown in FIG. 1, and FIG. 3 is a cross-sectional view taken along the line A-A' of FIG. 2.

Figure 3:
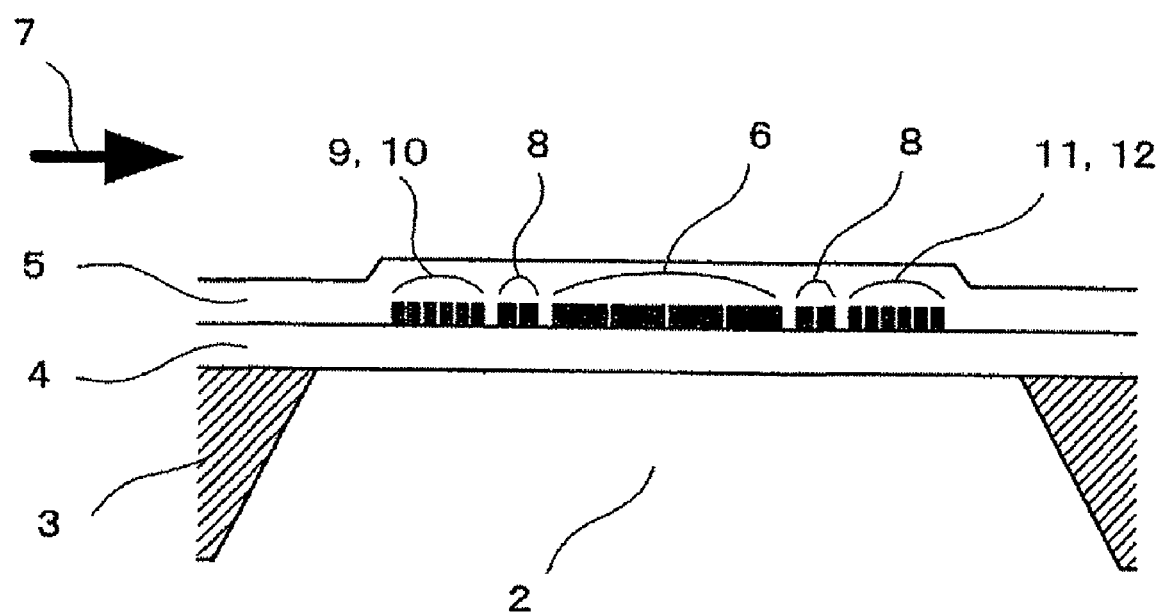
FIG. 3 is a cross-sectional view taken along the line A-A' of FIG. 2.

In FIGS. 1 to 3, a substrate 3 of the sensor element 1 is made of a material having good thermal conductivity, such as silicon or ceramics. Then, an insulating film 4 is formed on top of the substrate 3, which in turn is subjected to etching on the back side thereof to thereby form the diaphragm unit 2 on the insulating film 4.

A heat resistor 6 is formed on the surface of the diaphragm unit 2. The heat resistor 6 is heated so that its temperature is higher than the temperature of airflow 7 by a certain temperature. Then, a heating temperature sensor 8 is formed around the heat resistor 6, and temperature variation sensors 9, 10, 11 and 12 are formed on both sides of the heating temperature sensor 8 (or on the upstream and downstream sides of the airflow 7).

Temperature sensing resistors 13, 14 and 15 each having a resistance value changing according to the temperature of the airflow 7 are formed in the vicinity of the diaphragm unit 2 on the substrate 3. The temperature sensing resistors 13 to 15 and the heating temperature sensor 8 are combined to form a bridge circuit. The bridge circuit detects a change in temperature of the heating temperature sensor 8, controls a heating current for the heat resistor 6 on the basis of the detected result, and controls a heating temperature of the heat resistor 6.

In the sensor element 1 according to the first embodiment of the present invention, the heat resistor 6 is heated so that the temperature thereof can be higher than that of the airflow 7 by the certain temperature. Then, a temperature variation occurs in the upstream and downstream vicinities of the heat resistor 6 by the airflow 7 being produced. As a result, the heat resistor 6 undergoes a drop in temperature on the upstream side and a rise in temperature on the downstream side. The temperature variation sensors 9, 10, 11 and 12 detect this change in temperature to thereby obtain a signal according to an air flow rate.

Preferably, the heat resistor 6, the heating temperature sensor 8, the temperature variation sensors 9, 10, 11 and 12 and the temperature sensing resistors 13, 14 and 15 are made of a material having a resistance value changing according to the temperature and having a relatively high temperature coefficient of resistance. In the first embodiment, impurity-doped polycrystalline silicon is used as an example. Alternatively, impurity-doped single crystal silicon may be used to form the heat resistor 6, the heating temperature sensor 8, the temperature variation sensors 9, 10, 11 and 12 and the temperature sensing resistors 13, 14 and 15.

The heat resistor 6, the heating temperature sensor 8, the temperature variation sensors 9 to 12 and the temperature sensing resistor 13 to 15, which are present on the sensor element 1, are connected to pads 16a to 16n, and wired through the pads 16a to 16n to a driving circuit or the like by means of bonding wires.

Moreover, the heat resistor 6, the heating temperature sensor 8, the temperature variation sensors 9 to 12 and the temperature sensing resistor 13 to 15 are easy to connect prior to leading to pad units, because of being made of the same material. The heating temperature sensor 8 and the temperature sensing resistors 13, 14 and 15, in particular, have connections in the sensor element to form the bridge circuit, and thereby, the number of pads is reduced, and hence, the size of the sensor element is advantageously reduced.

Description will now be given with regard to the configuration of driving and detecting circuitry of the sensor element 1 according to the first embodiment.

Figure 4:
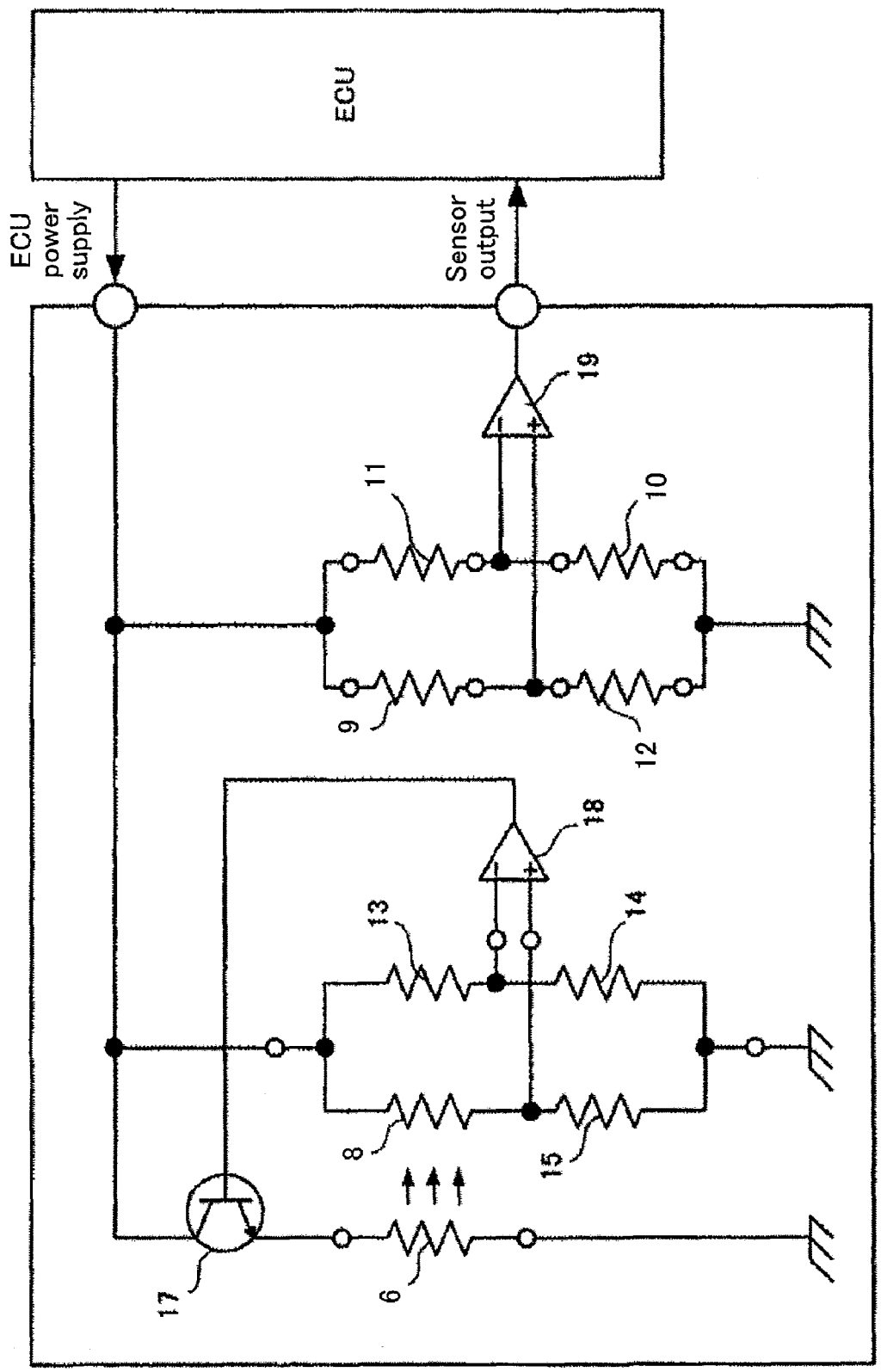
FIG. 4 is a configuration diagram of a driving circuit of the sensor element according to the first embodiment of the present invention.

FIG. 4 is a diagram showing the driving and detecting circuitry of the sensor element 1 according to the first embodiment. The first embodiment of the present invention is configured to provide the supply of power from an ECU as shown in FIG. 4 in order that an automotive ECU powers the thermal flowmeter to drive it. A general ECU has a power supply voltage of about 5 V and a current of the order of 20 mA.

First, the bridge circuit is formed by the heating temperature sensor 8 and the temperature sensing resistors 13, 14 and 15. Specifically, the heating temperature sensor 8 and the temperature sensing resistor 15 are connected in series, and the temperature sensing resistors 13 and 14 are connected in series. Then, the heating temperature sensor 8 and the temperature sensing resistor 15 are connected in parallel with the temperature sensing resistors 13 and 14. Then, a non-inverting input terminal of a differential amplifier 18 is connected to the junction of the heating temperature sensor 8 and the temperature sensing resistor 15, and an inverting input terminal of the differential amplifier 18 is connected to the junction of the temperature sensing resistors 13 and 14.

The bridge circuit is powered by an ECU power supply to operate on a certain voltage. A differential voltage of the bridge circuit or equivalently an output voltage from the differential amplifier 18 is fed to a base of a transistor 17. A collector of the transistor 17 is connected to the ECU power supply, and an emitter thereof is grounded through the heat resistor 6. The transistor 17 is configured to feed a current to the heat resistor 6, and to heat the heat resistor 6, under control of an output from the differential amplifier 18.

Moreover, the bridge circuit is formed by the temperature variation sensors 9, 10, 11 and 12. Specifically, the temperature variation sensors 9 and 12 are connected in series, and the temperature variation sensors 11 and 10 are connected in series. Then, the temperature variation sensors 9 and 12 are connected in parallel with the temperature variation sensors 11 and 10. Then, a non-inverting input terminal of a differential amplifier 19 is connected to the junction of the temperature variation sensors 9 and 12, and an inverting input terminal of the differential amplifier 19 is connected to the junction of the temperature variation sensors 11 and 10.

The amplifier 19 detects a differential voltage of the bridge circuit formed of the temperature variation sensors 9, 10, 11 and 12 to thereby obtain a sensor output in accordance with the air flow rate. This bridge circuit is also configured to be powered by the ECU power supply to operate on its voltage.

For the ECU to power the thermal flowmeter to drive it, the thermal flowmeter is limited in power consumption, and thus it is required that the voltage be within 5 V and the current fall within the order of 20 mA. Further, a current of the order of 10 mA is required in order that electrical circuitry, such as an amplifier, operates. Hence, the maximum permissible current to be supplied to the sensor element 1 is limited to the order of 10 mA.

In the sensor element 1, the heat resistor 6, in particular, requires power. Other components, namely, the heating temperature sensor 8, the temperature variation sensors 9, 10, 11 and 12 and the temperature sensing resistors 13, 14 and 15, can be given high resistance to reduce power consumption. It is therefore important that the heat resistor 6 be configured to be powered by 5 V and 10 mA, or equivalently at 50 mW or less.

Description will now be given with regard to the heat resistor 6 as configured to be powered at 50 mW or less.

For a flowmeter for measuring an intake air amount of an automobile engine, an operating temperature ranges from −40° C. to 125° C., and the maximum flow velocity of intake air is approximately 80 m/s. Discussion must be made on the premise that the flowmeter is used under such environmental conditions.

A specific configuration of the sensor element 1 will be described with reference to FIG. 2.

Power consumption by the heat resistor 6 is determined by heat radiation to the airflow 7 and heat conduction to the substrate 3. As for the heat conduction to the substrate 3, the full effect of thermal insulation can be obtained by the presence of the diaphragm unit 2, provided that a distance W1 from an edge of the heat resistor 6 to an edge of the diaphragm unit 2 is 100 micrometers or greater, and a film thickness of the diaphragm unit 2 is 5 micrometers or less.

When a method in which the temperature variation sensors 9, 10, 11 and 12 are used to detect the air flow rate is employed as in the case of the first embodiment of the present invention, it is desirable that a distance W2 from an edge of the temperature variation sensors 9 and 10 to the edge of the diaphragm unit 2 be 50 micrometers or greater, since the heat conduction to the substrate 3 can possibly cause a drop in temperature of the temperature variation sensors 9, 10, 11 and 12 and hence a deterioration in detection sensitivity.

The amount of heat radiated from the heat resistor 6 reaches a maximum when the airflow 7 reaches a maximum. Allowance must therefore be made for power consumption at a high flow rate.

The results of experiments on the power consumption by the heat resistor at fluid flow velocities of 10 m/s or higher will be given below.

Firstly, description will be given with regard to the relationship between the shape of the heat resistor 6 and the amount of heat radiated therefrom. Here, as for the dimensions of a region having the heat resistor 6 formed therein, the dimension in a substantially parallel direction of the flow of a fluid is defined as a width Wh (m) of the heat resistor 6, and the dimension in a direction perpendicular to the direction of the flow of the fluid is defined as a length Lh (m) of the heat resistor 6.

Figure 5:
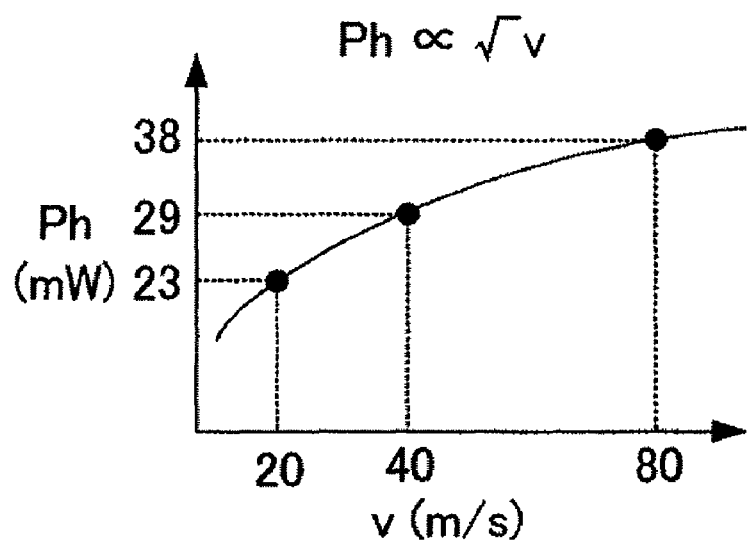
FIG. 5 is a graph showing the relationship between a flow velocity of a fluid and power consumption by a heat resistor.
Figure 6:
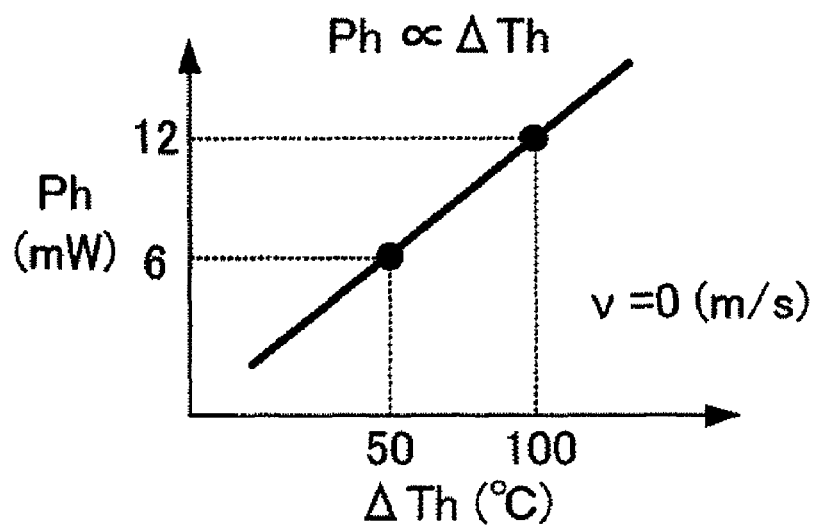
FIG. 6 is a graph showing the relationship between a temperature increase for the heat resistor and the power consumption by the heat resistor.

FIG. 5 is a graph showing the relationship between a flow velocity v of air (indicated by the horizontal axis (in m/s)) and power consumption Ph by the heat resistor 6 (indicated by the vertical axis (in mW)). FIG. 6 is a graph showing the relationship between a temperature increase ΔTh in the heat resistor 6 (indicated by the horizontal axis (in ° C.)) and the power consumption Ph by the heat resistor 6 (indicated by the vertical axis (in mW)).

Figure 7:
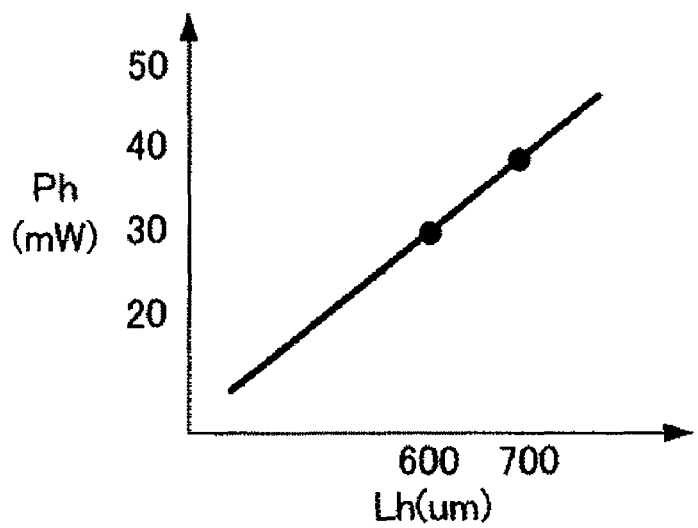
FIG. 7 is a graph showing the relationship between the length of the heat resistor and the power consumption by the heat resistor.
Figure 8:
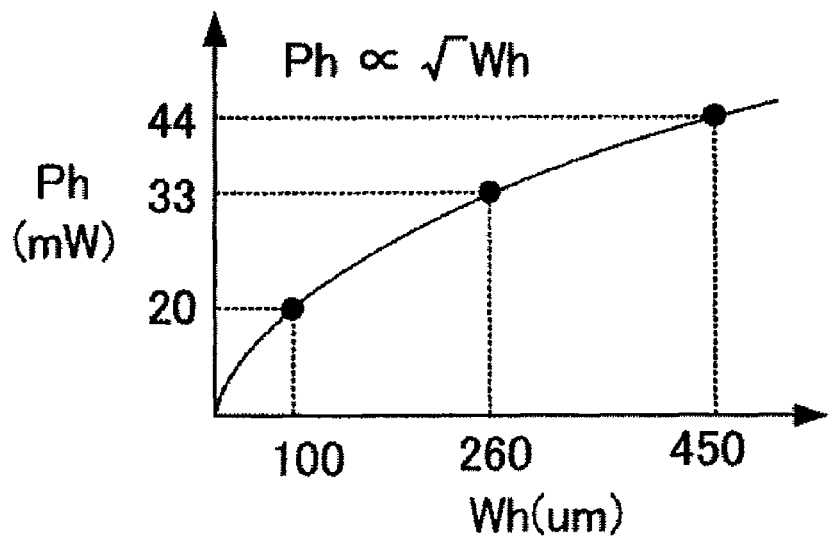
FIG. 8 is a graph showing the relationship between the width of the heat resistor and the power consumption by the heat resistor.

FIG. 7 is a graph showing the relationship between the length Lh of the heat resistor 6 (indicated by the horizontal axis (in micrometers)) and the power consumption Ph by the heat resistor 6 (indicated by the vertical axis (in mW)). FIG. 8 is a graph showing the relationship between the width Wh of the heat resistor 6 (indicated by the horizontal axis (in micrometers)) and the power consumption Ph by the heat resistor 6 (indicated by the vertical axis (in mW)).

As shown in FIG. 5, flow velocities v are 20, 40 and 80 m/s respectively in correspondence with 23, 29 and 38 milliwatts of power consumption by the heat resistor 6, and the power consumption Ph is substantially proportional to the one-half power of the flow velocity v. As shown in FIG. 6, temperature increases ΔTh are 50° C. and 100° C. respectively in correspondence with 6 and 12 milliwatts of power consumption by the heat resistor 6, and the power consumption Ph is proportional to the temperature increase ΔTh.

As shown in FIG. 7, lengths Lh are 600 and 700 micrometers respectively in correspondence with 30 and 40 milliwatts of power consumption by the heat resistor 6, and the power consumption Ph is substantially proportional to the length Lh of the heat resistor 6. As shown in FIG. 8, widths Wh are 100, 260 and 450 micrometers respectively in correspondence with 20, 33 and 44 milliwatts of power consumption by the heat resistor 6, and the power consumption Ph is proportional to the length Lh of the heat resistor 6, and is proportional to the one-half power of the width Wh of the heat resistor 6.

In other words, the power consumption Ph by the heat resistor 6 has the following relationship as expressed by Formula (1):

$$Ph = k \cdot \Delta Th \cdot Lh \cdot \sqrt{(Wh)} \cdot \sqrt{(v)} \qquad (1)$$

where k denotes a proportionality constant.

The experiments have shown that a temperature increase ΔTh of 100° C., a length Lh of 680 micrometers, a width Wh of 260 micrometers and a flow velocity v of 80 m/s lead to 38 milliwatts of power consumption Ph by the heat resistor 6. The proportionality constant k obtained by use of the above formula and the above results leads to k=3.9, and it has been shown that the power consumption Ph at a flow velocity of 80 m/s can be expressed by Formula (2).

$$Ph = 35 \cdot \Delta Th \cdot Lh \cdot \sqrt{(Wh)} \qquad (2)$$

A reduction in the width Wh of the heat resistor 6 causes a significant drop in temperature of the temperature variation sensors 11 and 12 on the downstream side particularly at a high flow rate, and hence a deterioration in sensitivity. On the other hand, setting the width Wh at a large value causes an increase in the overall width of the diaphragm unit 2, and hence a decrease in breakdown strength of the diaphragm unit 2. It is therefore desirable that the width Wh lies between 100 micrometers and 400 micrometers (100≦Wh≦400).

Taking the above into account, it is required that the optimum relationship between the length Lh of the heat resistor 6 and the temperature increase ΔTh for the heat resistor 6 be set to satisfy Formula (3), provided that the width Wh of the heat resistor 6 lies between 100 micrometers and 400 micrometers (100≦Wh≦400):

$$1.4 \leq \Delta Th \cdot Lh/Phmax \leq 2.8 \quad (3)$$

where Phmax denotes the maximum permissible power consumption (in watts) which is to supply to the heat resistor 6. It is preferable that, for example for 50 mW of power consumption Phmax, the optimum relationship between the length Lh of the heat resistor 6 and the temperature increase $\Delta Th$ in the heat resistor 6 be set to satisfy Formula (4).

$$0.07 \leq \Delta Th \cdot Lh \leq 0.14 \quad (4)$$

Description will now be given, as a supplementary explanation, with regard to the maximum permissible power Phmax for supply to the heat resistor 6.

The maximum permissible voltage and current for the supply of power from the ECU to the heat resistor 6 is 5±0.5 V and 10 mA, respectively. Since the power supply voltage can possibly vary ±0.5 V, the maximum permissible power for supply to the heat resistor 6 must be set to 45 mW.

Furthermore, in the case of equipping the automobile engine with the thermal flowmeter, it is necessary to take into account situations where the resistance value of the heat resistor 6 changes according to an ambient temperature since the thermal flowmeter is used under a condition in which the ambient temperature ranges from −40° C. to 125° C.

The heat resistor 6 according to the first embodiment of the present invention is made of the impurity-doped polycrystalline silicon, and thus has a temperature coefficient of resistance of the order of 1000 ppm/° C. For example, a change in the ambient temperature from 25° C. to 125° C. causes a 1.1-fold increase in the resistance value Rh of the heat resistor 6. The 1.1-fold increase in the resistance value causes a $\sqrt{1.1}$-fold increase in an applied voltage, which, in turn, can possibly exceed the maximum permissible applied voltage. It is therefore desirable that the center value of the power consumption by the heat resistor 6 be set to 40 mW (i.e., 45 (mW)×0.9≈40 (mW)), allowing for a change in voltage caused by a change in resistance of the heat resistor 6.

Wiring resistance is also applied to the heat resistor 6. In the first embodiment, a wiring unit 20 is formed between the heat resistor 6 and the pads 16i and 16j, as shown in FIG. 1. The presence of resistance of the wiring unit 20 causes a loss of power consumption. In the first embodiment, the resistance value of the wiring unit 20 is set at about 10% of the resistance value of the heat resistor 6. As a result, the power consumption by the heat resistor 6 is 90% of 40 mW, that is, approximately 36 mW, allowing for a loss of power at the wiring unit 20.

Taking the above matter into account, it is preferable that the optimum relationship between the length Lh and the temperature increase $\Delta Th$ in the first embodiment be set to substantially satisfy Formula (5) as derived from Formula (3), since the Phmax value is 36 mW (Phmax=36 (mW)).

$$0.05 \leq \Delta Th \cdot Lh \leq 0.1 \quad (5)$$

Description will now be given, as a supplementary explanation, with regard to the temperature increase $\Delta Th$ in the heat resistor 6.

The temperature increase $\Delta Th$ is defined as an average temperature of the heat resistor 6, since the heat resistor 6 has a temperature profile in a planar direction. Measurement of the temperature increase $\Delta Th$ does not contain the temperature of the wiring unit 20 of the heat resistor 6. In the case where the temperature increase $\Delta Th$ changes according to the flow rate of the airflow 7, the temperature increase $\Delta Th$ is set when the airflow 7 has the maximum flow velocity.

The sensitivity of the thermal flowmeter is determined in accordance with the temperature increase $\Delta Th$, and the higher $\Delta Th$ value is, the better the sensitivity becomes. However, an increase in the $\Delta Th$ value causes an increase in deterioration in resistance of the heat resistor 6 and the temperature increase sensor 8, and hence a deterioration in long-term reliability. It is therefore preferable that the temperature increase $\Delta Th$ be set at 200° C. or lower.

The low $\Delta Th$ value increases the likelihood of adhesion of dust, oil and the like in the air, and further leads to a great influence of adhesion of water. It is therefore preferable that the temperature increase $\Delta Th$ be set at 80° C. or higher.

Although the maximum flow velocity v is 80 m/s in the first embodiment of the present invention, the maximum flow velocity v can possibly be lower than 80 m/s depending on the type of automobile engine. In this case, Formula (3) is expressed as Formula (6) below.

$$1.4 \leq \Delta Th \cdot Lh \cdot \sqrt{(v/80)}/Phmax \leq 2.8 \quad (6)$$

Formula (4) is expressed as Formula (7).

$$0.07 \leq \Delta Th \cdot Lh \cdot \sqrt{(v/80)} \leq 0.14 \quad (7)$$

Then, the resistance value Rh of the heat resistor 6 is set at its optimum value in the following manner. First, the resistance value Rh is set to 450Ω (Rh=450Ω), in view of the fact that a maximum permissible voltage Vhmax for application to the heat resistor 6 is 4.5 V, and that the maximum permissible current for supply to the heat resistor 6 is 10 mA. Moreover, the resistance value Rh is set to lie between 360Ω and 54Ω, assuming that resistance variations depending on a manufacturing process are within ±10%, and that resistance variations due to the change in the ambient temperature are within ±10%.

According to the first embodiment of the present invention, as described above, it has been found out that, in order to reduce power consumption by the thermal flowmeter while maintaining good flow rate detection sensitivity, the power consumption by the heat resistor 6 can be reduced under certain conditions, and the certain conditions have been set.

Specifically, it has been found out that the conditions for maintaining the good flow rate detection sensitivity are that the relationship among the length Lh of the heat resistor 6, the temperature increase $\Delta Th$ in the heat resistor 6, and the maximum permissible power Phmax for supply to the heat resistor 6 satisfies Formula (3), provided that the width Wh of the heat resistor 6 lies between 100 micrometers and 400 micrometers (100≤Wh≤400).

Hence, the length Lh of the heat resistor 6 and the temperature increase $\Delta Th$ in the heat resistor 6 are set so that the power consumption Phmax is reduced within a range in which Formula (3) is satisfied, thereby making it possible to reduce the power consumption by the thermal flowmeter while maintaining the good flow rate detection sensitivity.

Description will now be given below with regard to a second embodiment of the present invention. For the second embodiment, description will be given centering on the points which are different from the first embodiment.

The second embodiment of the present invention is characterized in that the heat resistor 6, the heating temperature sensor 8, the temperature variation sensors 9, 10, 11 and 12 and their wiring units according to the first embodiment are made of a metallic material, such as a platinum thin film or a nickel alloy thin film. The platinum thin film has a temperature coefficient of resistance of 2000 ppm/° C. to 4000 ppm/° C. Thus, there is a great change in resistance due to the change in the ambient temperature, as compared to the first embodiment.

For example, if the temperature coefficient of resistance is set at 3000 ppm/° C., the change in the ambient temperature from 25° C. to 125° C. causes approximately a 1.3-fold increase in the resistance value of the heat resistor 6 (i.e., 1+0.003·(125−25)=1.3). This exhibits wide resistance variations, and hence causes wide variations in applied voltage, as compared to the heat resistor according to the first embodiment. Accordingly, the center value of the maximum permissible power for supply to the heat resistor is given by Formula (8).

$$45\ (mW)/1.3=34.6\ (mW) \quad (8)$$

Further, the center value of the maximum permissible power is approximately 31 mW, assuming that the loss of power through the wiring unit 20 of the heat resistor 6 is 10%.

If the Phmax value is set to 31 mW (Phmax=31 (mW)), the optimum relationship between the temperature increase $\Delta Th$ and the length Lh is set to satisfy Formula (9) as derived from Formula (3).

$$0.043 \leq \Delta Th \cdot Lh \leq 0.086 \quad (9)$$

Description will now be given with regard to the resistance value Rh of the heat resistor 6 according to the second embodiment of the present invention.

In the heat resistor 6 according to the second embodiment of the present invention, the resistance variations due to the ambient temperature are approximately within ±30%, since variations in the resistance value depending on the manufacturing process are within ±10%, and the temperature coefficient of resistance is higher. It is therefore preferable that the resistance value Rh of the heat resistor 6 be set to lie between 270Ω and 630Ω, with the center at 450Ω.

Besides being able to obtain the same advantageous effect as the first embodiment, the second embodiment of the present invention can reduce a deterioration in resistance with time due to heating as compared to the first embodiment in which the polycrystalline silicon or the single crystal silicon is used, when the heat resistor 6, the heating temperature sensor 8, the temperature variation sensors 9, 10, 11 and 12 and their wiring units are made of the metallic material, such as the platinum thin film or the nickel alloy thin film. Thus, in the second embodiment, it is preferable that the temperature increase $\Delta Th$ in the heat resistor 6 be set to lie between 80° C. and 300° C.

Figure 9:
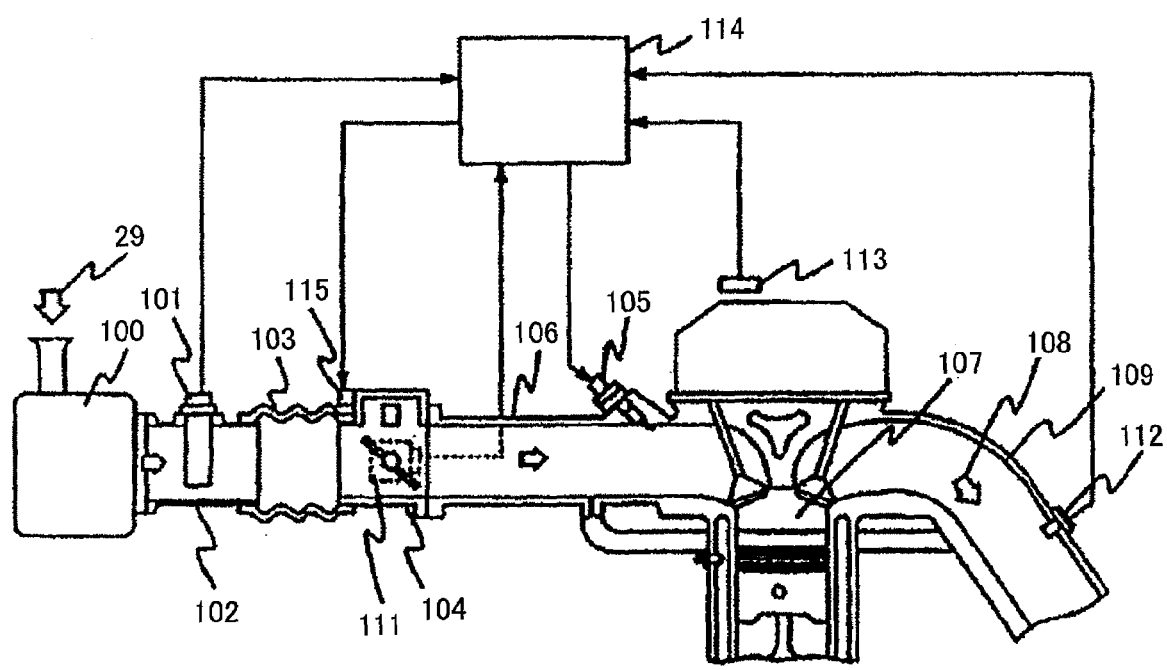
FIG. 9 is an illustration for a third embodiment of the present invention, showing an operation control system for an internal combustion engine using a thermal flowmeter as an air flow rate measuring apparatus.

FIG. 9 is an illustration showing a third embodiment of the present invention, showing an operation control system for an internal combustion engine of an electronic fuel injection type including the thermal flowmeter of the present invention as applied to an air flow rate measuring apparatus 101.

In FIG. 9, intake air 29 taken in through an air cleaner 100 is taken in by an engine cylinder 107 through a body 102 having the air flow rate measuring apparatus 101 disposed therein, an air intake duct 103, a throttle body 104, and an intake manifold 106 including an injector (or a fuel injection valve) 105 supplied with fuel. Then, gas 108 generated by the engine cylinder 107 is exhausted through an exhaust manifold 109 to the outside.

An air flow rate signal and an intake air temperature signal outputted by the air flow rate measuring apparatus 101, a throttle valve angle signal outputted by a throttle angle sensor 111, an oxygen content signal outputted by an oxygen analyzer 112 disposed in the exhaust manifold 109, and an engine speed signal outputted by an engine speed tachometer 113 are fed to an ECU 114.

The ECU 114 sequentially performs operation on the fed signals to determine an optimum fuel injection quantity and an idle air control valve travel, and controls the injector 105 and an idle air control valve 115 by using the determined values.

The air flow rate measuring apparatus 101 according to the present invention as applied to the internal combustion engine of the electronic fuel injection type enables the supply of power from the ECU 114, and thus enables low power consumption without reducing the heating temperature of the heat resistor, that is, without reducing flow-rate detection accuracy (or engine control accuracy).

Incidentally, the present invention may be applied not only to the thermal flowmeter for measuring air flow rate fed to the internal combustion engine of the automobile, but also to flow rate measurement for use in control using a diesel engine of a ship, a power generator, or the like.

What is claimed is:

1. A thermal flowmeter comprising a heat resistor and a temperature sensor element, wherein
   the heat resistor is arranged so that power supplied from an engine control unit makes the temperature of the heat resistor higher than a temperature of a fluid flow being measured by a temperature increase $\Delta Th$ (° C.), and the temperature sensor is arranged to output a value from which a fluid flow rate is measured, and
   provided that a maximum permissible power to be supplied to the heat resistor from the engine control unit is denoted by Phmax(W), a length Wh(m) of the heat resistor in a direction of flow of the fluid and a length Lh(m) of the heat resistor in a direction perpendicular to the direction of flow of the fluid are set so as to satisfy a formula: $Ph\ max \geq 35 \cdot \Delta Th \cdot Lh \cdot \sqrt{(Wh)}$.

2. The thermal flowmeter according to claim 1, wherein the heat resistor and the temperature sensor element are formed on a thin film portion formed on a substrate.

3. The thermal flowmeter according to claim 2, wherein the length Wh(m) of the heat resistor in the direction of flow of the fluid and the length Lh(m) of the heat resistor in the direction perpendicular to the direction of flow of the fluid are set so that the maximum value of the power consumption $Ph=35 \cdot \Delta Th \cdot Lh \cdot \sqrt{(Wh)}$ of the heat resistor becomes 50 mW or less.

4. The thermal flowmeter according to claim 2, wherein the heat resistor is made of impurity-doped polycrystalline silicon or single crystal silicon having a temperature coefficient of resistance of 1000 ppm/° C. to 2000 ppm/° C., the temperature increase $\Delta Th$ is set so as to be between 80° C. and 200° C. inclusive, and a resistance value of the heat resistor is set so as to be between 360Ω and 540Ω inclusive.

5. The thermal flowmeter according to claim 2, wherein the heat resistor is made of a metallic material having a temperature coefficient of resistance of 2000 ppm/° C. to 4000 ppm/° C., the temperature increase $\Delta Th$ is set so as to be between 80° C. and 300° C. inclusive, and the resistance value of the heat resistor is set to be between 270Ω and 630Ω inclusive.

6. The thermal flowmeter according to claim 2, further comprising a temperature sensing resistor for detecting the temperature of the heat resistor, the temperature sensing resistor being disposed in a vicinity of the heat resistor.

7. The thermal flowmeter according to claim 2, wherein the temperature sensor element is arranged to detect a temperature variation between fluids upstream and downstream of the heat resistor, and measures fluid flow rate by using the detected temperature variation.

\* \* \* \* \*